Jan. 23, 1934. H. HONNEF 1,944,239
ELECTRIC WIND DYNAMO
Original Filed April 15, 1931
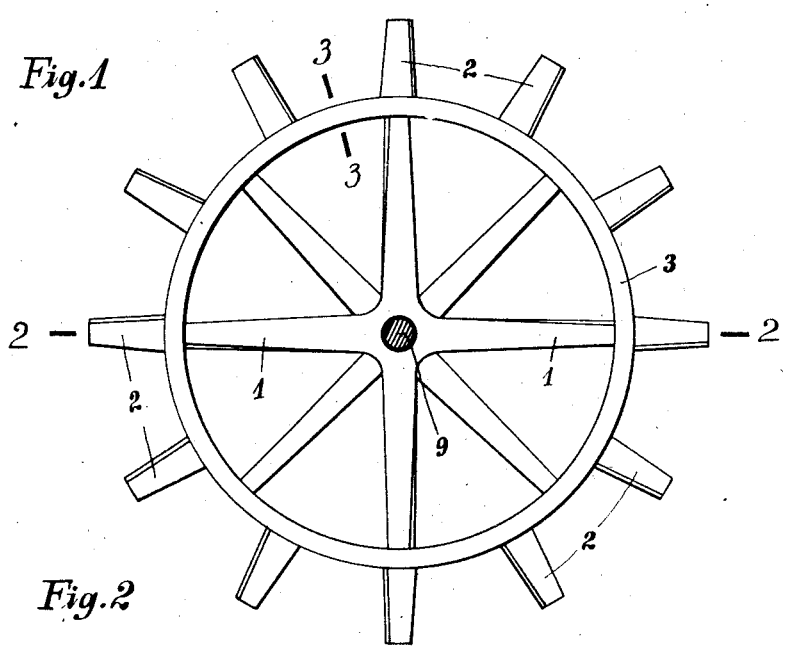
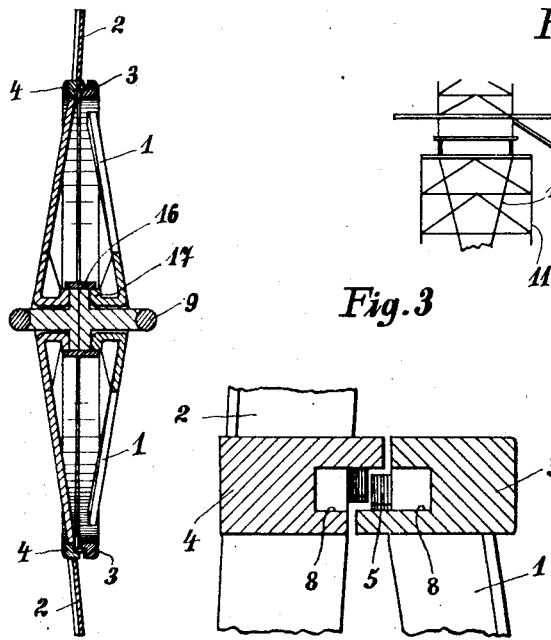
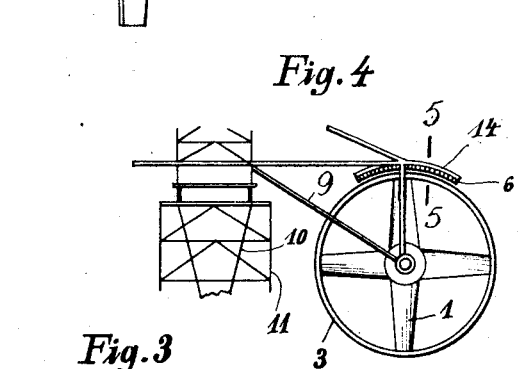
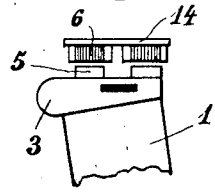
inventor:

Patented Jan. 23, 1934

1,944,239

UNITED STATES PATENT OFFICE 1,944,239

ELECTRIC WIND DYNAMO

Hermann Honnef, Dinglingen, Baden, Germany

Original application April 15, 1931, Serial No. 530,294, and in Germany March 19, 1930. Divided and this application July 18, 1932. Serial No. 623,276

8 Claims. (Cl. 290—55)

This is a division of application Serial No. 530,294, filed April 15, 1931.

This invention relates to a wind dynamo of the kind wherein dynamo members are connected to rims on the wind wheels for direct generation of electric current without the employment of gears, and the invention consists broadly in providing the wheels with spokes which are inclined so as to carry the rim outside the central plane of the wheel. This arrangement, which is intended for very large wheels, has the advantage that the forces which tend to strain the wheel, i. e., the centrifugal force and the wind pressure, can be made to neutralize each other so as to prevent contact between the complementary dynamo members.

Preferably two co-axial wheels, rotating in opposite directions, are arranged together for co-operation with each other, complementary dynamo members being connected to the two rims. In this case the spokes of the two wheels are inclined in opposite directions and maintain the rims between the central planes of the wheels.

Fig. 1 of the accompanying drawing represents a side view of a wind wheel structure comprising two co-axial wheels, Fig. 2 is a section on the line 2—2 of Fig. 1, Fig. 3 is a section on the line 3—3 of Fig. 1 on an enlarged scale, Fig. 4 is a side view of an arrangement wherein a wind wheel co-operates with stationary dynamo members, and Fig. 5 is a section on the line 5—5 of Fig. 4 on an enlarged scale.

The wind wheels are supported by means of outriggers 9 which turn about a pivot 10 at the top of a tower 11 for holding the wheels to the wind.

Each wind wheel structure preferably comprises two independently movable, co-axial wheels 1 and 2 the rims 3 and 4 of which are fitted respectively with dynamo members 5 and 6 for the direct generation of electric current. The dynamo members are arranged in recesses 8 of the rims and are suitably protected from rain. In the illustrated arrangement the rims 3 are arranged in juxtaposition and provided with overlapping portions. The spokes of the front wheel 1 are constructed as vanes for driving the wheel. The spokes of the rear wheel 2 are of small dimensions so as to make little resistance to the wind, and the wheel is fitted with vanes arranged radially outside and connected to the wheel rim. The vanes are set so as to drive the wheels in opposite directions, and they are dimensioned so that the wheels rotate at about equal speed. As the wheels rotate, the dynamo members generate electric current which is led off and utilized in any suitable manner. The spokes of the front wheel are inclined backwards from the centre of the wheel, and those of the rear wheel are inclined forwards, the rims being in each case maintained outside the central plane of the wheel. As the wheels are of considerable dimensions, they are liable to be strained by wind pressure and by centrifugal force. In the case of the front wheel, the wind pressure under centrifugal force will act on the rim 3 in different directions and substantially neutralize each other. In the case of the rear wheel the effect of the combined forces will be to expand the rim 4 and cause it to recede from the rim 3. In this manner the rims and dynamo members will be prevented from being brought into contact with each other by strong gusts of wind.

Brake elements 16 and 17 are provided within the wheel structure and may be operated automatically in known manner by centrifugal force or, under the influence of the tilting movement of the frame, by weighted levers.

Instead of two wheels co-operating for generating the electric current, a single armature wheel may, as shown in Fig. 5, co-operate with field magnets 6 carried by a rigid bracket 14. The vanes of the wheel are, as shown in Fig. 6, inclined rearwards so that the horizontal and centrifugal forces will counteract each other, as already explained, for maintaining the dynamo members in their relative positions.

The wind wheels are preferably employed for generating an alternating current which is subsequently converted first into direct current and then into three-phase current.

The wheel rims and vanes may be made of iron or other metal and adapted to be used as electric elements, for instance an antennæ for the radiation of electric energy.

I claim:

1. In a wind dynamo of the character described, a wind wheel structure comprising two co-axial wind wheels having rims carried by inclined spokes in planes situated between the central planes of the two wheels, the spokes of one wheel being constructed as vanes, the other wheel having radial vanes carried by the rim outside the latter, the vanes being adapted to rotate the two wheels in opposite directions, and complementary dynamo members connected to the two rims for the generation of electric current.

2. A structure as claimed in claim 1 wherein the two rims are arranged in juxtaposition.

3. A structure as claimed in claim 1 wherein the two rims are arranged in juxtaposition and recessed for the reception of the dynamo members.

4. A structure as claimed in claim 1 wherein the two rims are arranged in juxtaposition and formed with overlapping parts as well as with recesses for the reception of the dynamo members.

5. The structure claimed in claim 1 in combination with brake elements arranged within the wheel structure.

6. A structure as claimed in claim 1 wherein the vanes and rims are metallic and electrically insulated from one another.

7. A structure as claimed in claim 1 wherein the vanes and rims are made of iron and adapted to serve as electric elements.

8. A structure as claimed in claim 1 wherein the vanes and rims are metallic and adapted to serve as antennæ for the radiation of electric energy.

HERMANN HONNEF.